N. K. LYMAN.
CANE HARVESTER.
APPLICATION FILED JULY 14, 1919.
1,383,833.
Patented July 5, 1921.
3 SHEETS—SHEET 1.
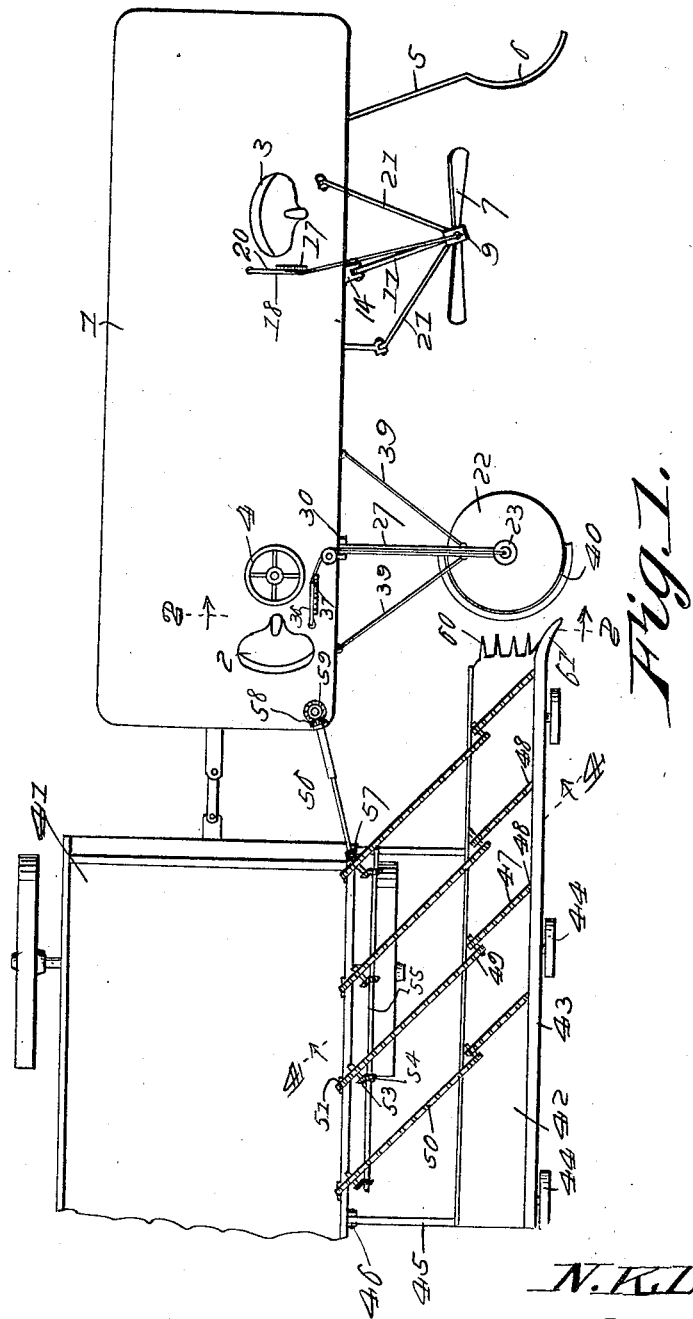
Inventor
N. K. Lyman,
By *[signature]*
Attorney

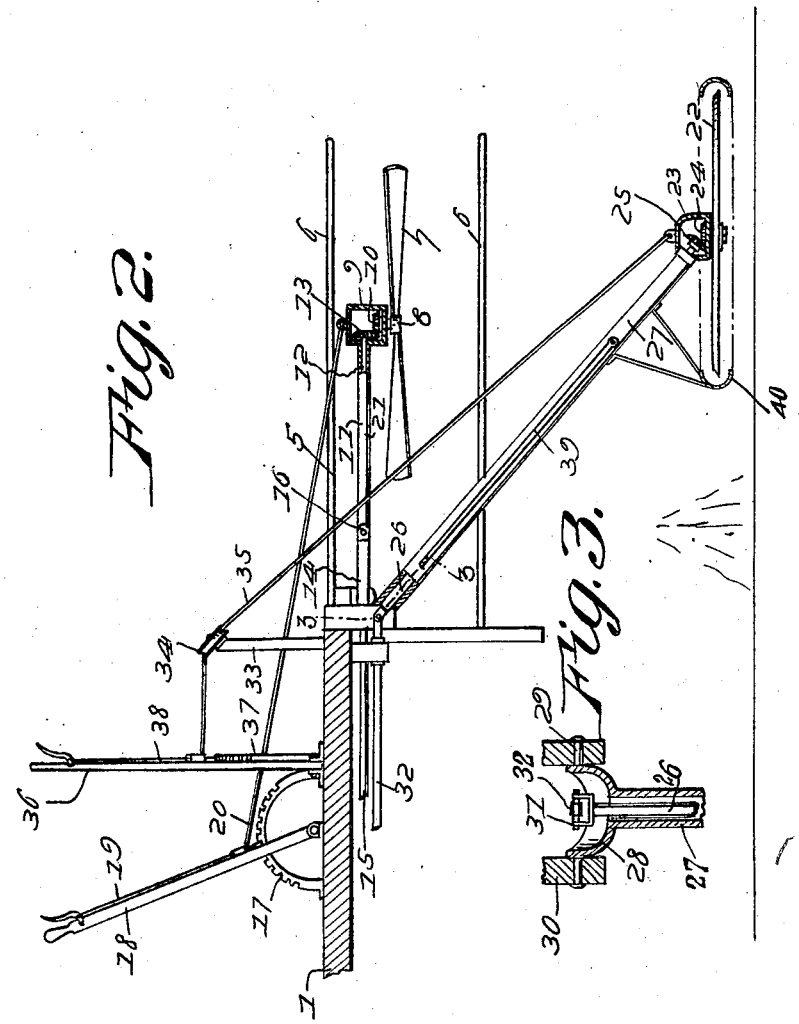

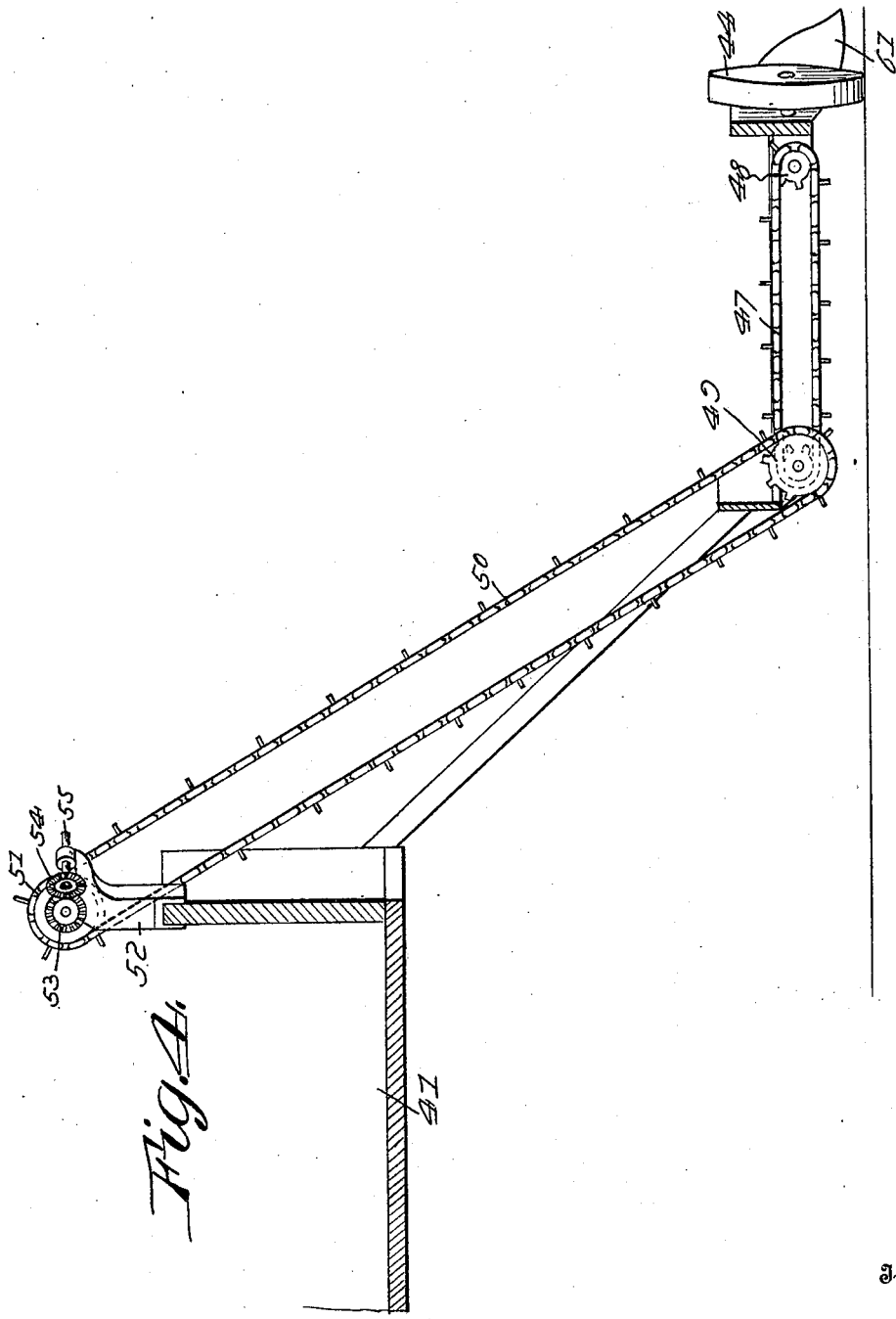

UNITED STATES PATENT OFFICE.

NORMAN K. LYMAN, OF SAN FRANCISCO, CALIFORNIA.

CANE-HARVESTER.

1,383,833.   Specification of Letters Patent.   Patented July 5, 1921.

Application filed July 14, 1919. Serial No. 310,781.

*To all whom it may concern:*

Be it known that NORMAN K. LYMAN, a citizen of the United States of America, residing at San Francisco, in the county of San Francisco and State of California, has invented new and useful Improvements in Cane-Harvesters, of which the following is a specification.

The object of the invention is to provide a harvesting machine for sugar cane in which the cane stalks will be drawn over and the tops removed and subsequent to this the stalks severed close to the ground, the topping mechanism and the stalk severing mechanism being so disposed with reference to each other that the tops and the stalks are laid in individual rows, the stalk row being in line with a gatherer forming part of the invention and transferred by the gatherer to a conveyance to which the gatherer is attached. The stalk severing mechanism and the topping mechanism are carried on a carriage or conveyance which may be either motor driven or horse drawn as desired. Both the topping device and the stalk severing device are capable of adjustment with relation to the ground.

To illustrate and describe the invention a specific embodiment is adhered to but to this embodiment it is not to be restricted. The right is reserved to make such changes or alterations as the actual reduction to practice may suggest, in so far as such changes or alterations are compatible in spirit with the annexed claims.

The same numerals of reference designate the same parts throughout the several figures of the drawings, wherein:

Figure 1 is a top plan view of the invention.

Fig. 2 is a section on the line 2—2 of Fig. 1.

Fig. 3 is a detail sectional view on the line 3—3 of Fig. 2.

Fig. 4 is a section on the line 4—4 of Fig. 1.

To carry the invention into effect, there is provided a tractor or horse drawn vehicle 1, whichever is found to be the most expedient to employ. This vehicular apparatus comprises a top platform on which the seats 2 and 3 are mounted, the seats 2 being convenient to a steering wheel 4 by means of which the vehicle or the machine 1 may be guided.

Adjacent the forward end of the machine 1 but projecting laterally from one side thereof there are arms 5 which are inclined forwardly and provided with an arcuate portion 6 adjacent their free terminals. These arms are designed to engage the sugar stalks and to bring them toward the side of the machine as the latter advances, the stalks passing under these arms after the machine has passed far enough but, of course, bending down to permit such passing under the arms.

Mounted directly behind the arms 5 there is a topping mechanism comprising a pair of rotatable cutter blades 7 which project readily from diametrically opposite sides of a hub 8, the latter carrying a stub shaft which is appropriately journaled on the bottom wall of the housing 9, interior to which the stub shaft has attached to it a beveled gear 10. The housing 9 has formed therewith a tubular member 11 in which a shaft 12 is journaled. This shaft 12 at one end carries a beveled gear 13 which meshes with the beveled gear 10.

The tubular member 11 at the end remote from the housing 9 has a hinged connection with a tubular member 14 projecting laterally from the side of the machine or vehicle 1 and the shaft 12 at this hinged connection is universally connected to a shaft 15 which is operatively connected to the tractor wheels of the machine 1 for the purpose of imparting rotation to the shaft 15. This operative connection is not shown because it is not essential to a complete understanding of the invention.

The topping blades 7 are designed to be raised or lowered, hence the hinged connection between the tubular members 11 and 14, as indicated at 16 and previously referred to. To provide for this raising and lowering being under the control of an operator, a toothed segment 17 is mounted on the platform of the vehicle 1 adjacent the seat 3, while a hand lever 18 is pivotally mounted on the platform of the vehicle and carries a spring latch 19 which engages with the teeth of the segment 17; a connecting rod 20 operatively connecting the lever 18 with the housing 9, obviously being pivotally connected with the two to permit the housing and with it the blades 7 to swing downward or upward as the lever is swung back and forth on its pivotal connection.

To secure the supporting means of the topping blades against lateral strain, the diagonally disposed braces 21 are provided and these are connected between the housing 9 and the vehicle platform, as shown in Fig. 1, obviously having pivotal connections with the housing and with the platform so as not to interfere with the adjustment of the topping blades in a vertical plane. To the rear of the topping blades 7, there is a stalk severing knife in the form of a cutting disk 22. This disk is carried by a stub shaft which is rotatably mounted in a housing 23. Interior to the housing the stub shaft carries a beveled gear 24 which meshes with a beveled gear 25 carried at one end of a shaft 26 which is rotatably mounted in a tubular member or sleeve 27 which is integrally connected to the housing 23 at its outer end. The sleeve or tubular member 27 at its inner end is formed with a fork 28, the arms of which adjacent their terminals carry the trunnions 29 which are pivotally mounted in bearing blocks 30 attached on the edge of the platform of the vehicle. A universal joint 31 effects connection between the shaft 26 and a shaft 32 which is carried by the vehicle 1 under the platform and connects with either the driving means for the vehicle or its tractor wheel for the purpose of communicating motion to the shaft 32 and thereby rotating the cutting knife 22 through the medium of the connections between the shaft 32 and the cutting knife.

The cutting disk or knife 22 is designed to be elevated and to this end there is mounted on top of the platform of the vehicle 1 a standard 33 on top of which there is mounted a sheave pulley 34, the latter having trained thereover a cable or flexible member 35, one end of which connects with the housing 23 and the other end with a hand operated lever 36 pivotally mounted on top of the platform of the vehicle adjacent the seat 2. Positioned for coöperative action with this lever 36 there is a toothed segment 37 with whose teeth there engages a spring latch 38 carried by the lever obviously for holding the lever in its various adjusted positions. By this construction the operator handling the machine at the steering wheel 4 may elevate or lower the cutting disk 22 as desired by shifting the lever 36 to position the cutting disk close to the ground or to elevate it a considerable distance therefrom.

To insure the mechanism supporting the cutting disk from undue lateral strain, brace rods 39 are provided and connect one end to the sleeve 27 and the other end to the edge of the platform of the vehicle 1, those ends connecting with the vehicle being spaced from the inner or upper end of the tubular member 27 on opposite sides of the latter and being pivotally connected to the platform so as to provide for the elevating and lowering of the cutting disk without interference or binding by the brace members.

A guard 40 connected with the housing 24 shields the cutting disk for half of its periphery and is positioned at the rear of the latter.

The mechanism just described is that for topping and severing the stalks. In order that the severed stalks may be gathered, a suitable vehicular apparatus 41 is connected with the vehicle 1, to be drawn by the latter. This vehicular apparatus 41 is preferably an ordinary wagon and on the same side of the apparatus on which the topping blades 7 and cutting disk 22 are carried, a suitable truck is provided, this truck consisting of a platform 42 having a side rail or plate 43 and supporting wheels 44 arranged in tandem on one side. The truck platform 42 is connected with the wagon body 41 by means of upwardly inclined arms 45 which are pivotally connected as indicated at 46 to the wagon body. This construction provides for the raising and lowering of the truck as the whole apparatus is advanced over uneven ground. The truck platform is cut away to provide run ways for the diagonally disposed chains 47 which are trained over sprockets 48 mounted in the platform on opposite sides thereof, those sprockets mounted on the inner side of the platform being carried on a common shaft with the sprockets 49 over which conveyer chains 50 are trained, these latter chains being trained also over sprockets 51 which are rotatably mounted in brackets 52 mounted upon and carried by the upper edge of one side of the wagon body. Each bracket 52 is operatively connected with a beveled gear 53 and all of these beveled gears 53 mesh with beveled gears 54 carried on a shaft 55 appropriately journaled in the several brackets 52. The forward sprocket 51 is driven by a shaft 56 consisting of two telescopic sections, this shaft 56 at one end being connected to the small shaft carrying the sprocket 51 by means of a universal joint as indicated at 57. The remaining end of the shaft 56 carries a gear 58 meshing with a beveled gear 59 carried on a shaft designed for operative connection with the driving means for the shafts 32 and 15.

It is obvious that many different conventional forms of driving mechanism could be employed for moving the shafts 15, and 32 and that on which the beveled gear 59 is carried and such means are not essential to an understanding of the invention and have therefore been omitted here.

At the forward end of the truck, the platform 42 is provided with a plurality of spaced teeth 60 and the side rail or plate 43 at the forward end is formed with an outwardly turned or flaring projection 61.

In the operation of the invention, the vehicle 1 is advanced over the ground, either under its own power or by means of draft animals. The arms 5 are thereupon brought into contact with the sugar stalks and because of the forward inclination of the arms these stalks are swept toward the side of the vehicle being bent down until after the vehicle has passed to a point which will permit the stalks to pass under the arms. The cutting blades 7 the while will be moving and as these stalks, after having been bent down and having passed under the arms 5, begin to rise they will be encountered by the cutting blades 7 and the tops severed therefrom. The cutting blades 7, it will be observed, are comparatively close to the vehicle 1. Therefore the stalk tops will be thrown down toward the ground adjacent the vehicle 1 and will fall in a row as the apparatus advances. The tops having been removed from the stalks they will begin to rise and reaching their normal positions with the tops removed will be encountered by the cutting disk 22 which will sever them close to the ground. They will then fall in a row adjacent to that in which the tops lie. The continued advance of the vehicle will bring the flaring end 61 of the side rail 43 and the teeth 60 of the platform 42 into contact with the stalks and they will be carried upon the platform falling on the conveyer chains 47 which will advance them to the conveyer chains 50 the latter carrying them up and depositing them in the vehicular apparatus 41.

The invention having been described, what is claimed as new and useful is:

1. In a sugar cane harvester, a vehicle, a stalk topping mechanism carried by the vehicle on one side of the latter and adjacent said side, stalk severing means also carried by the vehicle but to the rear of the topping mechanism and at a greater distance from the side of the vehicle than the topping mechanism, and means carried by the vehicle for bending stalks over toward the latter to have their tops removed by the topping mechanism after which they may be cut by the severing means.

2. In a sugar cane harvester, a vehicle, a stalk topping mechanism carried by the vehicle on one side of the latter and adjacent said side, stalk severing means also carried by the vehicle but to the rear of the topping mechanism and at a greater distance from the side of the vehicle than the topping mechanism, and means carried by the vehicle for bending stalks over toward the latter to have their tops removed by the topping mechanism after which they may be cut by the severing means, and stalk catching means carried in the rear of the severing means.

3. In a sugar cane harvester, a vehicle, stalk topping means carried by the vehicle on one side thereof but close to the side of the vehicle, means for elevating and lowering the topping mechanism, a stalk severing device also carried by the vehicle but at a greater distance from the side thereof than the topping mechanism, means for elevating and lowering the severing means, and means carried by the vehicle adjacent the forward end thereof for bending the stalks over in the direction of the vehicle to have their tops removed by the topping mechanism after which they may be cut by the severing means.

4. In a sugar cane harvester, a vehicle, stalk topping means carried by the vehicle on one side thereof but close to the side of the vehicle, means for elevating and lowering the topping mechanism, a stalk severing device also carried by the vehicle but at a greater distance from the side thereof than the topping mechanism, means for elevating and lowering the severing means, and means carried by the vehicle adjacent the forward end thereof for bending the stalks over in the direction of the vehicle to have their tops removed by the topping mechanism after which they may be cut by the severing means, and stalk catching means carried directly in rear of the severing means.

In testimony whereof he affixes his signature.

NORMAN K. LYMAN.